(12) United States Patent
Zhou et al.

(10) Patent No.: US 12,458,479 B2
(45) Date of Patent: Nov. 4, 2025

(54) ORAL CARE IMPLEMENT AND HANDLE THEREOF

(71) Applicant: Colgate-Palmolive Company, New York, NY (US)

(72) Inventors: Jiang Zhou, Yangzhou (CN); Yanmei Ji, Jiangsu (CN); Tonny He, Yangzhou (CN)

(73) Assignee: Colgate-Palmolive Company, New York, NY (US)

( * ) Notice: Subject to any disclaimer, the term of this patent is extended or adjusted under 35 U.S.C. 154(b) by 350 days.

(21) Appl. No.: 18/256,714

(22) PCT Filed: Dec. 10, 2020

(86) PCT No.: PCT/CN2020/135086
§ 371 (c)(1),
(2) Date: Jun. 9, 2023

(87) PCT Pub. No.: WO2022/120671
PCT Pub. Date: Jun. 16, 2022

(65) Prior Publication Data
US 2024/0041580 A1  Feb. 8, 2024

(51) Int. Cl.
*A61C 17/22* (2006.01)
*A46B 15/00* (2006.01)

(52) U.S. Cl.
CPC ........ *A61C 17/227* (2013.01); *A46B 15/0012* (2013.01); *A61C 17/221* (2013.01); *A61C 17/222* (2013.01)

(58) Field of Classification Search
CPC .. A46B 15/0012; A61C 17/221; A61C 17/222
See application file for complete search history.

(56) References Cited

U.S. PATENT DOCUMENTS

| 4,365,376 A | 12/1982 | Oda et al. |
| 4,827,550 A | 5/1989 | Graham et al. |

(Continued)

FOREIGN PATENT DOCUMENTS

| CN | 101557775 | 10/2009 |
| CN | 101991274 | 3/2011 |

(Continued)

OTHER PUBLICATIONS

International Search Report and the Written Opinion of the International Searching Authority issued in International Application PCT/CN2020/087935 mailed Jan. 27, 2021.

(Continued)

*Primary Examiner* — Shay Karls (57) ABSTRACT

An oral care implement handle (200) having a gripping portion (210) and an oral care refill head (300) that is detachably coupled thereto. The oral care implement handle (200) may include the gripping portion (210) and a rocker unit (400) which includes a stem (250), a motor (224), and a motor chassis (410). The rocker unit (400) may be pivotably mounted within the gripping portion (210) so that upon pressure being applied an oral care refill head (300) which is coupled to the stem (250) that exceeds a pressure threshold, the rocker unit (400) may be altered from a normal position to an excessive pressure position. When in the excessive pressure position, the rocker unit (400) may actuate an actuator element (265) of a control unit (260) to initiate generation of a user perceptible signal.

16 Claims, 10 Drawing Sheets

(56) References Cited

U.S. PATENT DOCUMENTS

| | | | |
|---|---|---|---|
| 5,289,604 A | 3/1994 | Kressner | |
| 7,120,960 B2 | 10/2006 | Hilscher et al. | |
| 7,690,067 B2 | 4/2010 | Schaefer et al. | |
| 8,479,750 B2 | 7/2013 | Schaefer et al. | |
| 9,724,180 B1 | 8/2017 | Liu | |
| D819,337 S | 6/2018 | Yuan et al. | |
| D819,973 S | 6/2018 | Greve et al. | |
| D874,830 S | 2/2020 | Choi et al. | |
| 10,610,008 B2 | 4/2020 | Wagner et al. | |
| 10,704,660 B2 | 7/2020 | Fritsch et al. | |
| 2018/0087633 A1* | 3/2018 | Fritsch | A61C 1/18 |
| 2018/0168332 A1 | 6/2018 | Wagner et al. | |
| 2019/0320786 A1* | 10/2019 | Schäfer | A46B 15/0046 |

FOREIGN PATENT DOCUMENTS

| | | |
|---|---|---|
| CN | 103889365 | 6/2014 |
| CN | 103932497 | 7/2014 |
| CN | 104619212 | 5/2015 |
| CN | 107693151 | 2/2018 |
| CN | 108056833 | 5/2018 |
| CN | 207323577 | 5/2018 |
| CN | 108354687 | 8/2018 |
| CN | 108403239 | 8/2018 |
| CN | 109124801 | 1/2019 |
| CN | 210056312 | 2/2020 |
| CN | 111053622 | 4/2020 |
| CN | 210472325 | 5/2020 |
| CN | 111643209 | 9/2020 |
| DE | 202004006435 | 8/2004 |
| EP | 2234561 | 10/2010 |
| EP | 2104466 | 11/2013 |
| EP | 3470015 | 4/2019 |
| WO | 1999/020202 | 4/1999 |
| WO | 2005/046506 | 5/2005 |
| WO | 2009/077922 | 6/2009 |
| WO | 2013/101300 | 7/2013 |
| WO | 2017139256 | 8/2017 |
| WO | 2019/157787 | 8/2019 |
| WO | 2021/217535 | 11/2021 |
| WO | 2022/120671 | 6/2022 |

OTHER PUBLICATIONS

International Search Report and the Written Opinion of the International Searching Authority issued in International Application PCT/CN2020/135086 mailed Sep. 9, 2021.

* cited by examiner

FIG. 11

ORAL CARE IMPLEMENT AND HANDLE THEREOF

BACKGROUND

Toothbrushes generally include a handle for gripping by a user and a head that has cleaning elements thereon that engage the user's oral cavity surfaces for cleaning. In manual toothbrushes, the cleaning elements become worn after several months of use which requires replacement of the entire toothbrush. In electric toothbrushes, the cleaning elements become worn after several months of use which requires replacement of a refill head that is configured to be coupled to a particular handle. Furthermore, when brushing it is important to make sure that the user does not apply too much pressure onto the teeth and gums because doing so will not only cause the cleaning elements to become worn more quickly, but it can also cause damage to the user's teeth and gums. Thus, a need exists for an oral care implement having a pressure detection and indication system to readily inform the user when they are applying too much pressure onto the teeth and gums.

SUMMARY

The present invention may be directed to an oral care implement having a gripping portion and an oral care refill head that is detachably coupled thereto. The invention may be directed to an oral care implement handle which includes the gripping portion but not the oral care refill head. The oral care implement handle may include the gripping portion and a rocker unit which includes a stem, a motor, and a motor chassis. The rocker unit may be pivotably mounted within the gripping portion so that upon pressure being applied an oral care refill head which is coupled to the stem that exceeds a pressure threshold, the rocker unit may be altered from a normal position to an excessive pressure position. When in the excessive pressure position, the rocker unit may actuate an actuator element of a control unit to initiate generation of a user perceptible signal.

In one aspect, the invention may be an oral care implement handle comprising: a gripping portion having a housing defining an internal chamber and a distal end surface; a rocker unit comprising: a stem extending from the distal end surface of the gripping portion and configured to be detachably coupled to an oral care refill head; a motor operably coupled to the stem to impart movement to the stem, the motor having a motor axis; and a motor chassis supporting the motor and comprising a contact element; and a power source positioned within the internal chamber; a control unit operably coupled to the motor and the power source, the control unit comprising an actuator element, the control unit configured to initiate generation of a user perceptible signal upon the actuator element being actuated; and a first resilient element operably coupled to the motor chassis that biases the rocker unit into a normal position; the rocker unit pivotably mounted within the internal chamber so as to be pivotable relative to the housing about a fixed pivot axis so that upon a pressure being applied to the oral care refill head that exceeds a pressure threshold, the bias of the first resilient element is overcome and the rocker unit is altered from the normal position to an excessive pressure position in which the contact element actuates the actuator element.

In another aspect, the invention may be an oral care implement that comprises the oral care implement handle noted in the paragraph above, and an oral care refill head comprising a head portion having an oral care treatment tool and a sleeve portion configured to be detachably coupled to the stem of the oral care implement handle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 1:
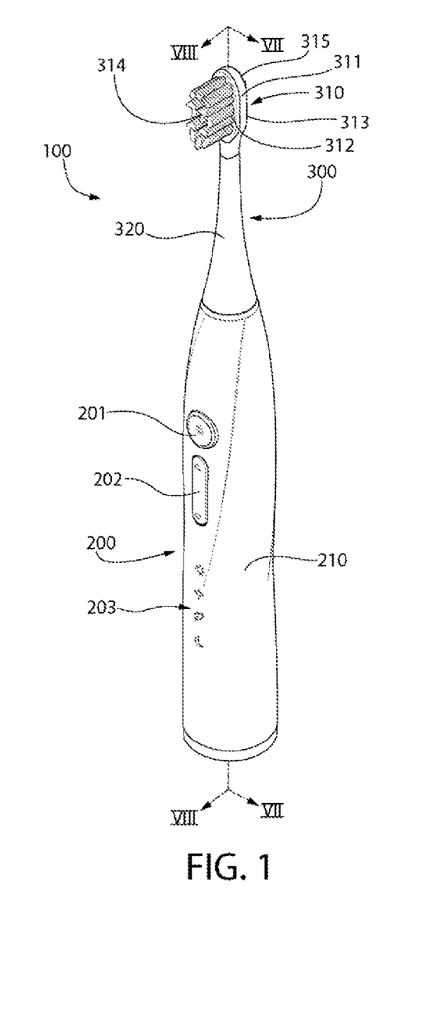
FIG. 1 is a front perspective view of an oral care implement with an oral care implement handle and an oral care refill head in an assembled state.
Figure 2:
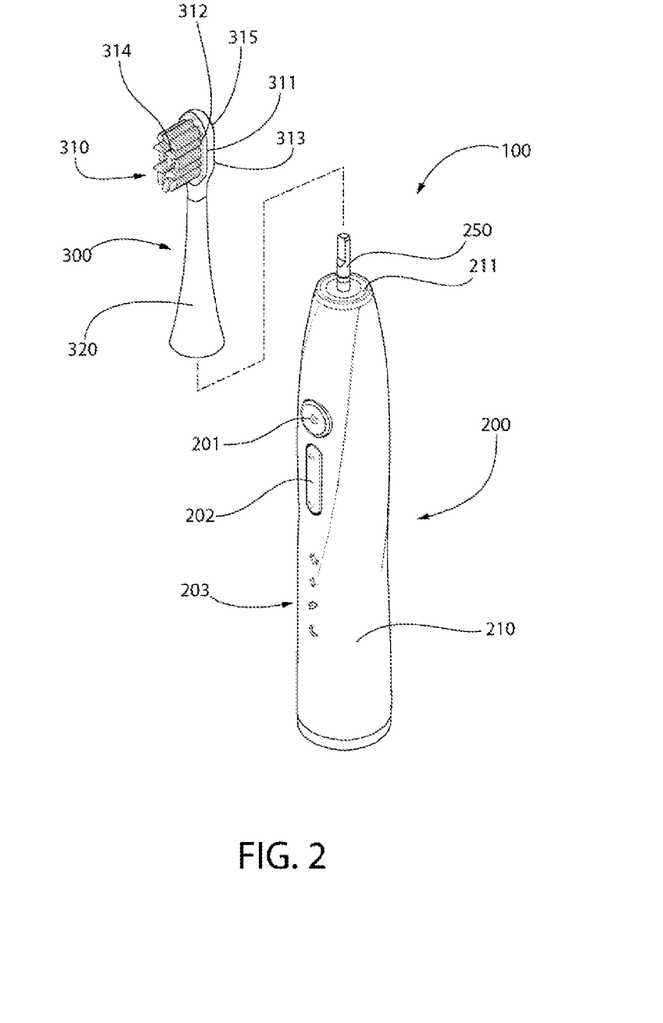
FIG. 2 is a front perspective view of the oral care implement of FIG. 1 with the oral care implement handle and the oral care refill head in a detached state.

Referring first to FIGS. 1 and 2, an oral care implement 100 will be described in accordance with an embodiment of the present invention. In the exemplified embodiment, the oral care implement 100 is a powered or electric toothbrush. In other embodiments, the oral care implement 100 may be a manual toothbrush. In still other embodiments, the oral care implement 100 may be other hygienic tools for treating the oral cavity such as a tongue scraper, a gum and soft tissue cleanser, a water pick, an interdental device, a tooth polisher, a specially designed ansate implement having tooth engaging elements, or any other type of implement that is commonly used for oral care. In still other embodiments, the oral care implement 100 may be a personal care implement instead of an oral care implement. Examples of such personal care implements include hairbrushes, razors, body scrubbers, skin treatment devices, or the like. Thus, it is to be understood that the inventive concepts discussed herein can be applied to any type of oral care implement or personal care implement unless a specific type of implement is specified in the claims. The structural and functional details of the oral care implement 100 will be provided below in accordance with exemplary embodiments of the present invention.

The oral care implement 100 generally comprises a handle (also referred to herein as an oral care implement handle) 200 and an oral care refill head 300. The handle 200 is the portion of the oral care implement 100 that is gripped by a user during use. The oral care refill head 300 is the portion of the oral care implement 100 that performs the cleaning or other hygienic function. As shown in FIG. 2, the oral care refill head 300 can be detached from the handle 200, and thus when they are coupled together the oral care refill head 300 is detachably coupled to the handle 200. Thus, the oral care refill head 300 may be detached from the handle 200 and replaced with a new oral care refill head 300 when cleaning elements on the oral care refill head 300 become worn over time. This allows the handle 200 to continue to be used while the oral care refill head 300 is exchanged, which is important because the expensive electronic circuitry is located within the handle 200. Multiple users can also use the same handle 200 while placing their individual oral care refill heads thereon prior to use.

The oral care refill head 300 comprises a head portion 310 and a sleeve portion 320. The head portion 310 comprises an oral treatment tool (or head structure) 311 having a front surface 312 and a rear surface 313. Furthermore, in the exemplified embodiment, the head portion 310 comprises a plurality of tooth cleaning elements 314 extending from the front surface 312 of the oral treatment tool 311. The plurality of tooth cleaning elements 314 may comprise bristle tufts, filament bristles, fiber bristles, nylon bristles, polybutylene terephthalate (PBT) bristles, spiral bristles, rubber bristles, elastomeric protrusions, flexible polymer protrusions, lamella, combinations thereof, and/or structures containing such materials or combinations. Thus, any combination of these elements may be used to form one or more of the tooth cleaning elements 314 in some embodiments. Furthermore, where bristles are used for one or more of the tooth cleaning elements 314, such bristles can be tapered, end-rounded, spiral, or the like. The tooth cleaning elements 314 may be coupled to the head portion 310 using any known techniques such as staples, anchor-free tufting, in-mold tufting, PTT, or the like. In the exemplified embodiment, the tooth cleaning elements 314 comprises a plurality of tufts of bristles arranged in a particular pattern on the head portion 310. Of course, the particular pattern of the tooth cleaning elements 314 is not to be limiting of the present invention unless specifically claimed as such.

Furthermore, in the exemplified embodiment there is a soft tissue cleaner 315 positioned on the rear surface 313 of the head portion 310 of the oral care refill head 300. The soft tissue cleaner 315 may be formed from an elastomeric material such as thermoplastic elastomer that is injection molded onto the rear surface 313 of the head portion 310. The soft tissue cleaner 315 may include a pad portion and a plurality of protuberances protruding from the pad portion, or it may take on other configurations. In some alternative embodiments, the soft tissue cleaner 315 may include ridges, depressions, nubs, or any desirable feature for cleaning and/or scraping the tongue and its papillae. The soft tissue cleanser 315 may also be omitted in some embodiments.

Figure 7:
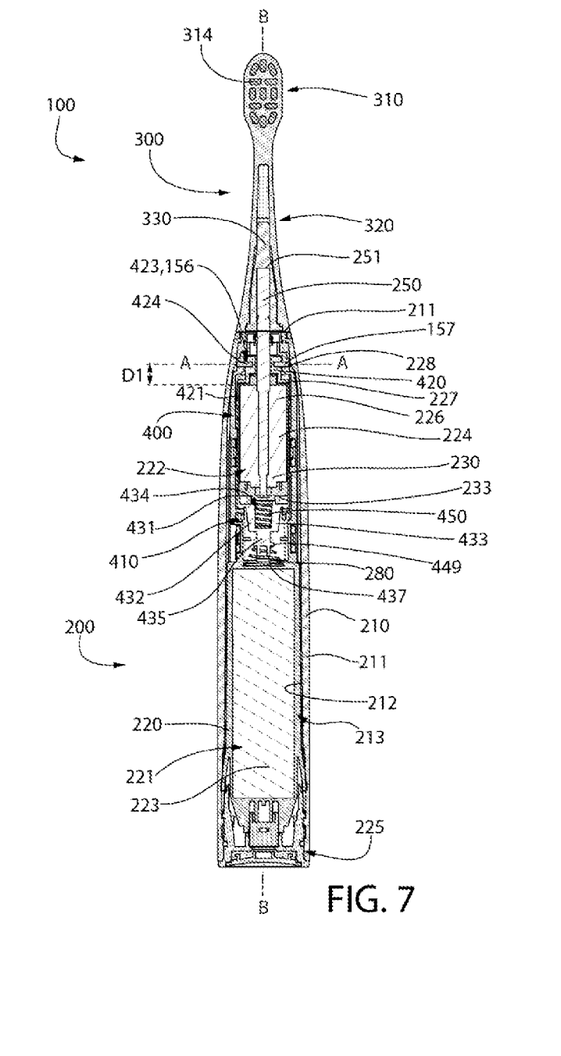
FIG. 7 is a cross-sectional view taken along line VII-VII of FIG. 1.
Figure 8:
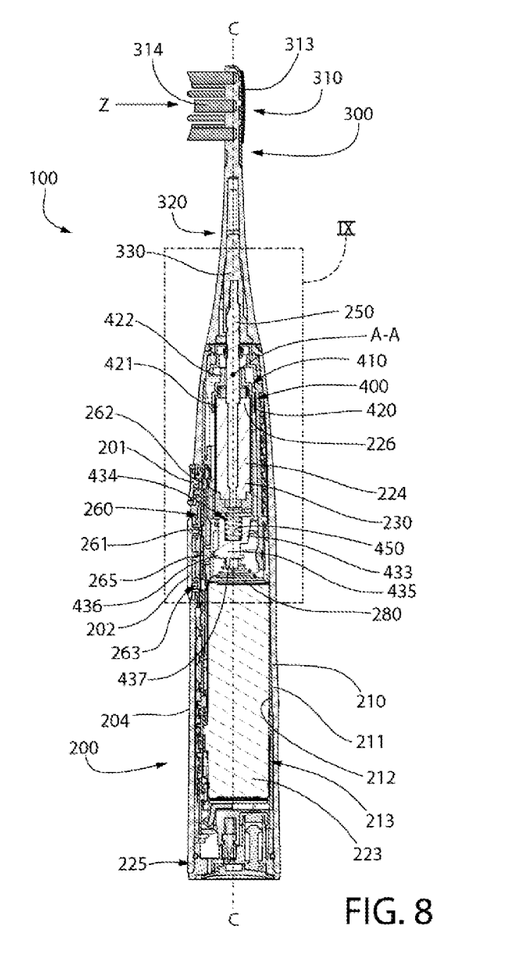
FIG. 8 is a cross-sectional view taken along lines VIII-VIII of FIG. 1, wherein the rocker unit thereof is in a normal position.

The sleeve portion 320 of the oral care refill head 300 is the portion of the oral care refill head 300 that is configured to attach to the oral care implement handle 200. In particular, the sleeve portion 320 of the oral care refill head 300 may fit over and interact with a stem 250 of the oral care implement handle 200 to facilitate coupling of the oral care refill head 300 to the oral care implement handle 200. Thus, the sleeve portion 320 of the oral care refill head 300 may comprise coupling features that interact with features of the stem 250 to detachably couple the oral care refill head 300 to the oral care implement handle 200. These features are shown in FIGS. 7 and 8 and will be described briefly below during the discussion of those figures.

The oral care implement handle 200 comprises a gripping portion 210 that terminates at a distal end surface 211 and the stem 250 which protrudes from the distal end surface 211 of the gripping portion 210. The distal end surface 211 of the gripping portion 210 forms a shoulder that a bottom end of the sleeve portion 320 of the oral care refill head 300 abuts against when the oral care refill head 300 is coupled to the handle 200. As will be discussed below, the stem 250 forms a part of a rocker unit 400 of the oral care implement handle 200 which works in conjunction with a control unit to notify a user when they are applying too much pressure during oral hygiene activities.

The gripping portion 210 of the handle 200 is the part of the handle 200 that is gripped by a user during oral hygiene activities and it may include various buttons, switches, indicators, lights, user controls, or the like to both allow a user to control functionality and operation of the oral care implement 100 and also provide information to the user. Specifically, the gripping portion 210 of the oral care implement handle 200 may comprise a power button 201 that can power the oral care implement 100 on and off (and provide power to a motor thereof as described in more detail below). The handle 200 may also include an intensity button 202 that allows the user to modify the speed or intensity of the motor or allows the user to change a mode of operation of the motor. The handle 200 may also include various indicators 203 that may be activated (e.g., lights that may be illuminated) to inform a user when the battery is low, when the user is brushing with too much pressure, when the oral care implement 100 is powered on, and various other information that may be helpful to a user. The handle 200 may have any desired shape designed for user comfort, and may include an elastomeric grip thereon for user comfort and to ensure a user can achieve an adequate grip during use even in a wet environment.

Referring to FIGS. 3, 4, 7, and 8, the oral care implement handle 200 will be further described. The gripping portion 210 of the oral care implement handle 200 comprises a housing 212 that defines an internal chamber 213 within which the electronic components of the oral care implement 100 are located. In particular, the oral care implement handle 200 comprises an electronic component chassis 220 that nests within the internal chamber 213 of the housing 212 formed by the gripping portion 210. The electronic component chassis 220 comprises a power source compartment 221 and a motor compartment 222. A power source 223 such as a battery is disposed within the power source compartment 221 of the electronic component chassis 220. A motor 224 is disposed within the motor compartment 222. The motor 224 and the power source 223 are operably coupled together so that upon a user activating the oral care implement 100 (such as by pressing the power button 201), power is supplied from the power source 223 to the motor 224 and the motor 224 is activated. The motor 224 comprises a motor axis C-C (depicted in FIG. 8).

Although the exemplified embodiment includes the electronic component chassis 220, the invention is not to be so limited in all embodiments. In particular, in some embodiments the gripping portion 210 of the handle 200 may include pockets or chambers or cavities configured to retain the power source 223 and the motor 224 therein, without requiring a separate electronics component chassis 220. Thus, variations to the manner in which the various electronic components of the oral care implement 100 are retained within the handle 200 may be possible within the scope of the invention set forth herein.

Figure 3:
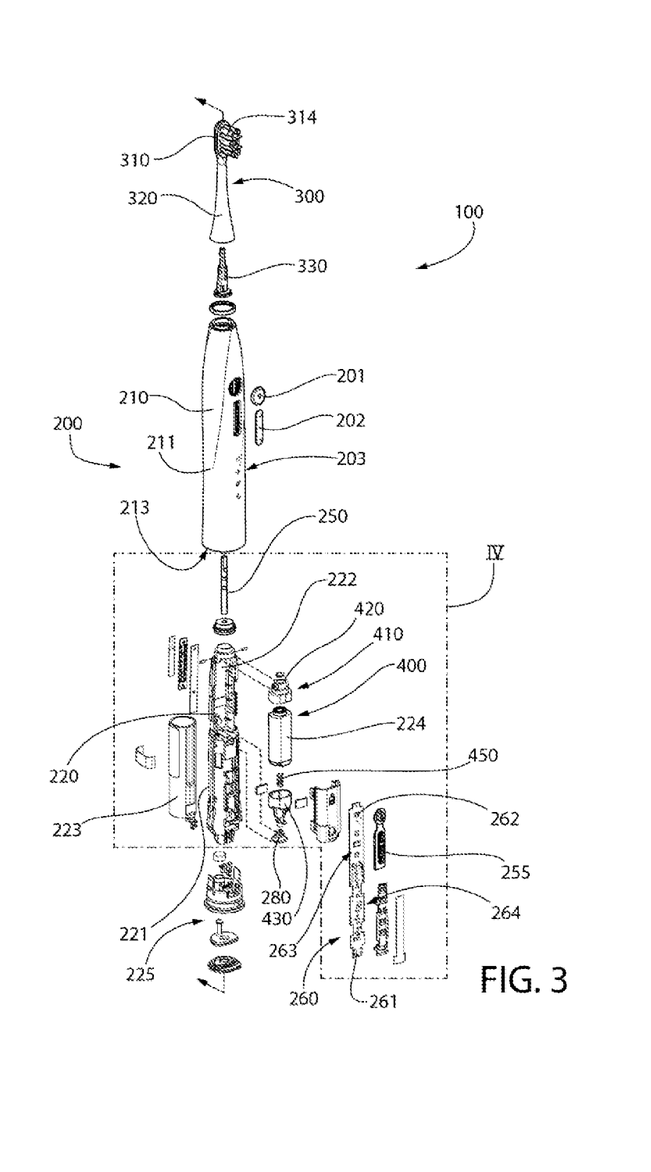
FIG. 3 is an exploded perspective view of the oral care implement of FIG. 1.
Figure 4:
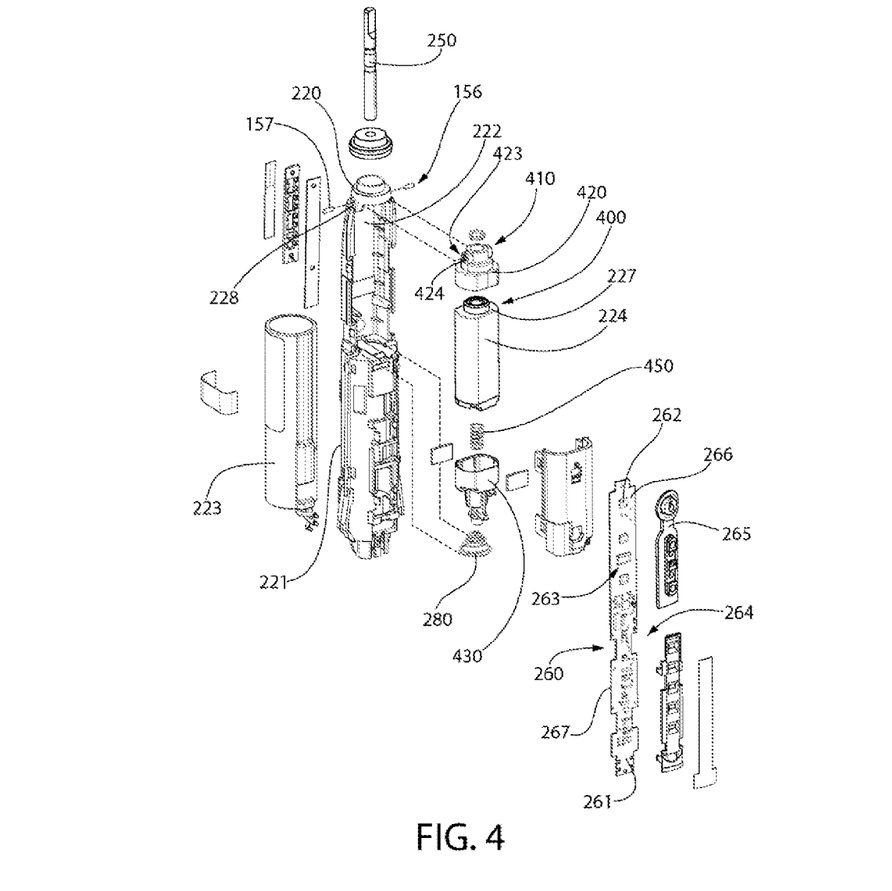
FIG. 4 is a close-up view of area IV of FIG. 3.

When the oral care implement 100 is assembled, the electronic component chassis 220 with the power source 223 and the motor 224 coupled thereto is positioned within the internal chamber 213 of the housing 212, which is defined by the gripping portion 210 of the oral care implement handle 200. Thus, the motor 224 and the power source 223 are disposed within the internal chamber 213 of the housing 212. Furthermore, the oral care implement handle 200 includes an end cap structure 225 that retains the electronic component chassis 220 in place within the internal chamber 213 and also closes/seals an opening in the bottom end of the housing 212.

Furthermore, the previously mentioned stem 250 is coupled to the motor 224 so that upon activation of the motor 224 by powering on the oral care implement 100, the motor 130 will impart movement to the stem 250 thereby causing the stem 250 to rotate, oscillate, or the like. In particular, the step 250 protrudes from the distal end surface 211 of the gripping portion 210 of the handle 200. Furthermore, when the oral care refill head 300 is coupled to the handle 200 as shown in FIGS. 7 and 8, the sleeve portion 320 of the oral care refill head 300 is positioned around (i.e., surrounds) a distal portion of the stem 250, the distal portion of the stem 250 being the portion of the stem 250 that protrudes beyond the distal end surface 211 of the gripping portion 210 of the handle 200. Because the oral care refill head 300 is positioned around the distal portion of the stem 250, the movement of the stem 250 by the motor creates vibrations on the oral care refill head 300, which causes the tooth cleaning elements 314 to vibrate, which optimizes the cleaning performance. In the exemplified embodiment, the stem 250 forms the feature of the handle 200 that couples to the oral care refill head 300 and also imparts movement to the cleaning elements of the oral care refill head 300.

In the exemplified embodiment, the oral care refill head 300 comprises a coupling component 330 that is disposed within the sleeve portion 320. The coupling component 330 may be disposed within an interior of the sleeve portion 320 in a fixed manner so that the coupling component 330 is fixed with respect to the remainder of the oral care refill head 300 (rather than being a detachable component). The coupling component 330 comprises various coupling features that facilitate the coupling of the oral care refill head 300 to the oral care implement handle 200, and more particularly to the stem 250 thereof. In particular, the coupling features of the coupling component 330 may be protrusions that mate with recesses in the stem 250, or vice versa, to facilitate a snap-fit type coupling between the oral care refill head 300 and the oral care implement handle 200. Of course, other types of coupling may be used including friction fit, mechanical engagement, threaded engagement, or the like in various different embodiments. Furthermore, in other embodiments the coupling features may be formed as an integral part of the oral care refill head 300, rather than requiring a separate coupling component 330 as in the exemplified embodiment.

The oral care implement handle 200 also comprises a control unit 260 that is operably coupled to the power source 223 and to the motor 224. Thus, the power source 223 provides power to the control unit 260 and the control unit 260 is configured to control operation of the motor 224 (on/off, operating speeds, etc.) in some embodiments. The control unit 260 may also control operation of other features of the oral care implement 100, such as the powering of a light source during certain situations (i.e., excess pressure being applied), which will be described in greater detail below.

The control unit 260 is located within the internal chamber 213 of the housing 212 of the gripping portion 210 of the handle 200. In the exemplified embodiment, the control unit 150 comprises a printed circuit board 261 and several electronic components thereon in electrical communication with one another. For example, the control unit 260 may comprise a power actuator 262. The power button 201 may be in operable coupling with the power actuator 262 of the control unit 260 to control the power on and power off function of the motor 224 (and of the oral care implement 100 more generally). Thus, pressing the power button 201 will cause the power button 201 to engage and actuate the power actuator 262 (which may be a trigger switch or the like), which will cause the control unit 260 to power the motor 224 on and/or off. The intensity button 202 may be in operable coupling with an intensity actuator 263 of the control unit 260 so that pressing the up or down arrows of the intensity button 202 causes the intensity button 202 to engage and actuate the intensity actuator 263, and in response the control unit 260 may change the mode of operation or increase or decrease the motor intensity or speed. There may be an elastomeric component 255 positioned between the power and intensity buttons 201, 202 and the printed circuit board 261 in some embodiments, as shown in FIGS. 3 and 4. The elastomeric component 255 biases the power button 201 away from the power actuator 262 and biases the intensity button 202 away form the intensity actuator 263 so that a user is required to press the power or intensity buttons 201, 202 to actuate the power or intensity actuators 262, 263.

The indicators 203 may be formed by transparent portions of the gripping portion 210 of the handle 200 that are aligned with light sources 264 on the printed circuit board 261 of the control unit 260 that illuminate when different thresholds are met. For example, when the battery power is below a threshold, a low battery light may illuminate and be seen through a transparent portion of the handle 200 (such as an icon that is readily identifiable as a battery power indicator). Furthermore, when excessive pressure is felt during brushing, a high pressure light may illuminate. Of course, other indicators 203 may be used to provide different indications to a user as desired. The control unit 260 may comprise a controller or processor that receives input from the various actuators and transmits instructions to the power source 223, motor 224, and various light sources to activate and deactivate accordingly. However, a processor or controller is not needed in all embodiments and in other embodiments activating and deactivating the various actuators opens and closes a switch which either causes power to be supplied to or prevents power from being supplied to the various components for activation and deactivation thereof. The various actuators described herein as being part of the control unit 260 may be various switches including trigger switches, contact switches, conductive switches, throw switches, push button switches, pressure switches, toggle switches, or other mechanical type switches. In other embodiments electronic switches could be used in place of the mechanical type switches.

In addition to the features above, the control unit 260 also comprises an actuator element 265 (shown in FIG. 8). In the exemplified embodiment, the printed circuit board 261 comprises a front surface 266 and a rear surface 267 opposite the front surface 266. The power and intensity actuators 262, 263 and the light sources 264 may be positioned on the front surface 266 of the printed circuit board 261 and the actuator element 264 may be positioned on the rear surface 267 of the printed circuit board 261. The power and intensity actuators 262, 263 and the light sources 264 may face outwards away from the internal chamber 213 and the actuator element 264 may face inwardly towards the internal chamber 213. Thus, while the power and intensity actuators 262, 263 may be actuated by a user pressing a button from the outside of the handle 200, the actuator element 264 may be actuated via movement of a contact element located inside of the internal chamber 213, as discussed in greater detail below.

In the exemplified embodiment, the actuator element 265 may be a trigger switch positioned on the printed circuit board 261. Thus, contact against the actuator element 264 with sufficient force to press the trigger switch will actuate the actuator element 265 and cause the control unit 260 to initiate generation of a user perceptible signal, as described herein. Furthermore, as described in greater detail below, the control unit 260 may be configured to initiate generation of a user perceptible signal upon the actuator element 265 being actuated. The user perceptible signal may be illumination of a light source, activation of an audible signal or alarm, a tactile signal such as a particular pattern of vibration, combinations thereof, or the like. The actuator element 265 may be actuated by the rocker unit 400 mentioned above and described in greater detail above, particularly in response to a user applying excessive pressure to the oral care refill head 300 during use of the oral care implement 100.

Referring to FIGS. 3-8 concurrently, the rocker unit 400 will be described. The rocker unit 400 generally comprises the stem 250, the motor 224, a motor chassis 410, and a second resilient element 450. The rocker unit 400 comprises the aforementioned components coupled together in a manner such that when excess pressure is applied onto the tooth cleaning elements 314 of the oral care refill head 300, the rocker unit 400 rocks or pivots within the internal chamber 213 of the handle 200. The rocking or pivoting of the rocker unit 400 within the internal chamber 213 of the handle 200 cause activation of the actuator element 265 of the control unit 260 so that a user perceptible signal can be generated to inform the user that he/she is applying too much pressure during oral hygiene activities.

The motor chassis 410 is positioned around at least a portion of the motor 224 and supports the motor 224 within the internal chamber 213 of the housing 212. Moreover, the motor chassis 410 comprises an upper portion 420 and a lower portion 430. In the exemplified embodiment, the upper and lower portions 420, 430 are discrete, distinct components. However, the invention is not to be so limited in all embodiments and in some alternative embodiments the upper and lower portions 420, 430 of the motor chassis 410 may be a singular, unitary component (i.e., the upper and lower portions 420, 430 may be connected). As will be discussed in greater detail below, the oral care implement handle 200 comprises a first resilient element 280 which is operably coupled to the motor chassis 410. In particular, the first resilient element 280 is coupled to the lower portion 430 of the motor chassis 410 and it biases the rocker unit 400 into a normal position (shown in FIGS. 8 and 9). An excess pressure applied by a user onto the oral care refill head 300 that exceeds the bias of the first resilient element 280 may cause the rocker unit 400 to be altered from the normal position to an excessive pressure position (shown in FIGS. 10 and 11). This function will be described in greater detail below.

Figures 5, 6:
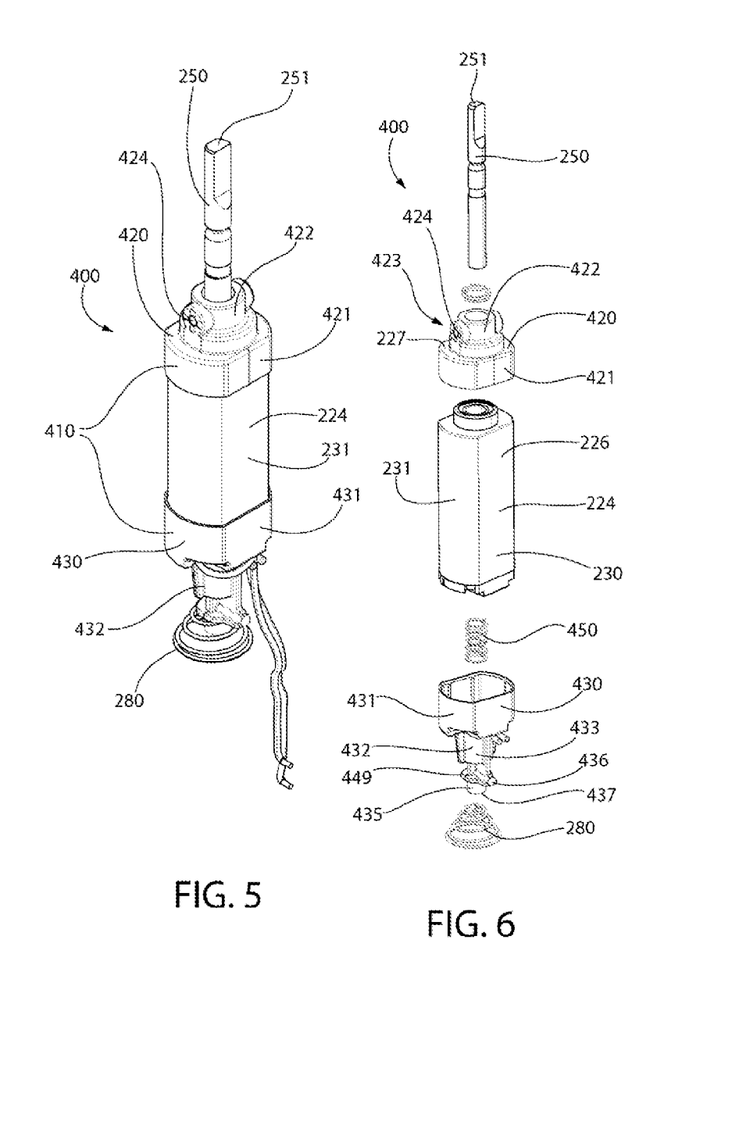
FIG. 5 is a perspective view of a rocker unit of the oral care implement of FIG. 1 in an assembled state.
FIG. 6 is a perspective view of a rocker unit of the oral care implement of FIG. 1 in a disassembled or exploded state.

The upper portion 420 of the motor chassis 410 comprises an upper sleeve section 421 and an upper hub section 422. When the motor chassis 410 is coupled to the motor 224 as shown in FIGS. 5, 7, and 8, a top portion 226 of the motor 224 nests within the upper sleeve section 421 and the stem 250 extends through the upper hub section 422. Thus, the upper sleeve section 421 of the upper portion 420 of the motor chassis 410 defines a cavity within which the top portion 226 of the motor 224 nests. Furthermore, there is an opening in the upper hub section 422 through which the stem 250 protrudes as the stem 250 extends from the motor 224 to its distal end 251. Furthermore, when the upper portion 420 of the motor chassis 410 is coupled to the motor 224, a portion of the upper portion 420 of the motor chassis 410, which includes the upper hub section 422, extends beyond a top end 227 of the motor 224. In the exemplified embodiment, the upper portion 420 of the motor chassis 410 is slid around the motor 224, but is not fixedly coupled thereto other than via friction fit. Of course, in other embodiments the upper portion 420 of the motor chassis 410 could be attached to the motor 224 using fasteners, mechanical engagement features, or the like.

Referring to FIGS. 4, 5, and 7, the upper hub section 422 of the upper portion 420 of the motor chassis 410 comprises a first pivot mounting means 423 that is configured to mate with a second pivot mounting means 156 to pivotably mount the rocker unit 400 within the internal chamber 213 of the housing 212. In the exemplified embodiment, the first pivot mounting means 423 comprises a pair of depressions (or blind holes) 424 that are formed into the upper hub section 422 of the upper portion 420 of the motor chassis 410. Furthermore, in the exemplified embodiment the second pivot mounting means 156 comprises a pair of bosses (or pins) 157 that are fixed relative to the housing 212. That is, the second pivot mounting means 156 do not move relative to the housing 212. The pair of bosses or pins 157 mate with the pair of depressions or blind holes 424 to pivotably mount the rocker unit 400 within the internal chamber 213. Of course, the invention is not to be limited by the particular structure that is used to form the first and second pivot mounting means 423, 156 in all embodiments. In particular, in some embodiments the first pivot mounting means 423 may comprise bosses or pins and the second pivot mounting means may comprise depressions or blind holes, while still achieving the same function and purpose of enabling the rocker unit 400 to pivot or rock within the internal chamber 213 as described further herein.

In the exemplified embodiment, the bosses or pins 157 of the second pivoting means 156 extend through openings 228 in the electronics component chassis 220 and into the depressions or blind holes 424 of the first pivot mounting means 423 of the upper portion 420 of the motor chassis 410. Thus, in the exemplified embodiment the rocker unit 400, via the upper portion 420 of the motor chassis 410, is pivotably coupled to the electronics component chassis 220, which in turn is fixedly coupled to the gripping portion 210 of the handle 200 within the internal chamber 213. Thus, due to this coupling the rocker unit 400 is also pivotable relative to the handle 200. However, the invention is not to be limited to the exact manner of coupling shown in the figures in all embodiments and the bosses or pins 157 could extend directly from the housing 212 of the gripping portion 210 of the handle 200 in some embodiments. Moreover, in other embodiments the bosses or pins 157 may be formed integrally with the housing 212 to protrude from the inner surface 212 of the housing 212 to form the second pivot mounting means 156.

The rocker unit 400 is pivotably mounted within the internal chamber 213 so as to be pivotable relative to the housing 212 about a fixed pivot axis A-A. Thus, regardless of the exact structure of the first and second pivot mounting means 423, 156, the rocker unit 411 is configured to pivot relative to the housing 212 about the fixed pivot axis A-A. In the exemplified embodiment, the fixed pivot axis A-A is orthogonal or perpendicular to a longitudinal axis B-B of the oral care implement 100, as shown in FIG. 7. In the exemplified embodiment, the first and second pivot mounting means 423, 156, and hence also the pivot axis A-A, are located at a first distance D1 above the top end 227 of the motor 223. Thus, the first pivot axis A-A is located between the top end 227 of the motor 223 and the distal end surface 211 of the gripping portion 210 of the handle 200.

The lower portion 430 of the motor chassis 410 comprises a lower sleeve section 431 and a body section 432. The lower sleeve section 431 defines a cavity and a bottom portion 230 of the motor 224 nests within the cavity of the lower sleeve section 431. That is, the lower sleeve section 431 is positioned around the bottom portion 230 of the motor 224. As seen in FIG. 5, when the upper and lower portions 420, 430 of the motor chassis 410 are positioned around the motor 224, there remains a middle portion 231 of the motor 224 which is not covered or surrounded by the motor chassis 410. Of course, in other embodiments the motor chassis 410 may cover more of, including up to the entirety of, the motor 224.

The body section 432 of the lower portion 430 of the motor chassis 410 extends downwardly from the lower sleeve section 431 and protrudes from a bottom end 233 of the motor 224. Thus, the body section 432 is located axially between the bottom end 233 of the motor 224 and the power source 223. In fact, in the exemplified embodiment the second resilient element 450, the body section 432 of the lower portion 430 of the motor chassis 410, and the first resilient element 280 are all positioned axially between the bottom end 233 of the motor 224 and the power source 223.

The body section 432 of the lower portion 430 of the motor chassis 410 comprises a top portion 433 that defines a cavity 434 and a post 435 protruding downwardly from the top portion 433. When the rocker unit 400 is assembled, the second resilient element 450 is disposed within the cavity 434 of the top portion 433 of the body section 432 of the lower portion 430 of the motor chassis 410. Moreover, the bottom portion 230 of the motor 224 nests within a cavity defined by the lower sleeve section 431 of the lower portion 430 of the motor chassis 410. In the exemplified embodiment, the second resilient element 450 is a compression spring, and more specifically a coil compression spring. That is, the second resilient element 450 is compressed between the bottom end 233 of the motor 224 and the lower portion 430 of the motor chassis 410. More particularly, the second resilient element 450 is compressed between the bottom end 233 of the motor 224 and a floor of the top portion 433 of the body section 431 of the lower portion 430 of the motor chassis 410.

The second resilient element 450 applies a spring force onto the motor 224 in the direction of the motor axis C-C, and more specifically in an upward direction towards the oral care refill head 300. The second resilient element 450 is aligned along the motor axis C-C when the rocker unit 400 is in both the normal position and excessive pressure position, as described further below. Thus, the second resilient element 450 functions to maintain the proper alignment of the rocker unit 400 within the internal chamber 213 of the housing 212.

The lower portion 430 of the motor chassis 410 also comprises a contact element 436. In particular, the contact element 436 protrudes from the post 435 of the body section 432 of the lower portion 430 of the motor chassis 410. The post 435 extends along the motor axis C-C and terminates in a free distal end 437. Furthermore, the contact element 436 comprises a protuberance that protrudes from the post 435 in a direction that is transverse to the motor axis C-C. The contact element 436 is the feature of the motor chassis 410 and of the rocker unit 400 more generally that actuates the actuator element 265 of the control unit 260 when pressure applied to the oral care refill head 300 exceeds a pressure threshold, as described further below.

The contact element 436 of the motor chassis 410 is axially spaced a second distance D2 from the bottom end 233 of the motor 224. In particular, the contact element 436 of the motor chassis 410 is located between the bottom end 233 of the motor 224 and the power source 223. The second distance D2 measured between the contact element 436 and the bottom end 233 of the motor 224 is greater than the first distance D1 measured between the pivot axis A-A (which is the location of the first and second pivot mounting means 156, 423) and the top end 227 of the motor 224. Moreover, the contact element 436 is axially aligned with the actuator element 265 of the control unit 260 (which may be a trigger switch located on the printed circuit board 261). This ensures that the contact element 436 is able to contact and actuate the actuator element 265 during an excess pressure situation.

As shown in FIG. 8, the contact element 436 protrudes from the post 435 in the same direction that the tooth cleaning elements 314 protrude from the head portion 310 of the oral care refill head 300. Thus, the contact element 436 protrudes from the post 435 in a direction that is towards a front surface 204 of the handle 200 of the oral care device 100. This is done because any excess pressure or force applied during toothbrushing will be applied onto the tooth cleaning elements 314 in a direction that is towards the rear surface 313 of the head portion 310. Moreover, due to the configuration of the first and second pivot mounting means 156, 423, this force applied onto the head portion 310 of the oral care refill head 300 will cause the rocker unit 400 to pivot/rock in a manner that will cause the contact element 436, which is located on a bottom portion of the rocker unit 400, to move in the opposite direction of the force being applied onto the head portion 310 of the oral care refill head 300. This functionality will be described in greater detail below with reference to FIGS. 8-11.

The first resilient element 280, which forms a part of the rocker unit 400, is operably coupled to the motor chassis 410 to bias the rocker unit 400 into the normal position, which is the position shown in FIG. 8. The normal position is the position of the rocker unit 400 when any pressure applied to the oral care refill head 300 is below a pressure threshold (which can be a zero pressure situation when the oral care implement 100 is not being used, or could be a low pressure situation when the oral care implement 100 is being used, but the user is brushing with appropriate pressure and not exceeding the pressure threshold).

In particular, the first resilient element 280 is coupled to the body section 432 of the lower portion 430 of the motor chassis 410, and more specifically to the post 435 thereof. Thus, the first resilient element 280 at least partially wraps around the post 435 to achieve the coupling between the first resilient element 280 and the motor chassis 410. There is a stopper protuberance 449 that protrudes from the post 435 just below the contact element 436 to prevent the first resilient element 280 from extending to a location beyond the stopper protuberance 449. Thus, the stopper protuberance 449 keeps the first resilient element 280 in a desired position and prevents the first resilient element 280 from sliding up along the post 435 past the stopper protuberance 449. Moreover, an opposite end of the first resilient element 280 is fixed relative to the housing 212. In the exemplified embodiment, the first resilient element 280 is fixedly coupled to the electronics component chassis 220, although it could be fixed directly to the housing 212 in other embodiments. Thus, a lower portion of the post 435 nests within an interior of the first resilient element 280 and an end of the first resilient element 280 abuts against the lower surface of the stopper protuberance 449.

Figure 10:
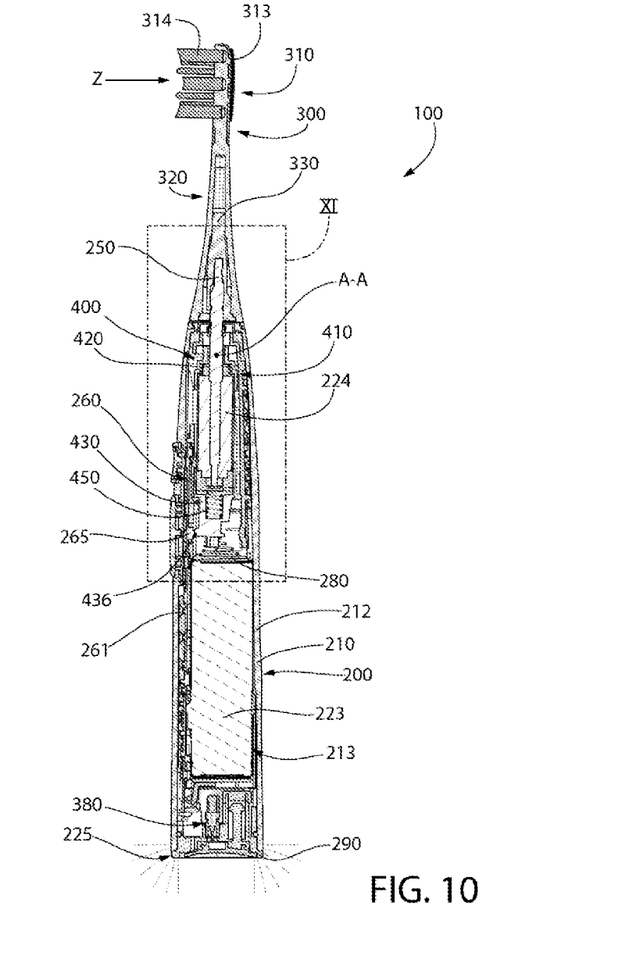
FIG. 10 is a cross-sectional view taken along line VIII-VIII of FIG. 1, wherein the rocker unit thereof is in an excessive pressure position.

In the exemplified embodiment, the first resilient element 280 is a compression spring, and more specifically a conical spring, a conical compression spring, a conical coil spring, or the like. The first resilient element 280 has one end fixed relative to the housing 212 and the opposite end fixed to the post 435 of the lower portion 430 of the motor chassis 410. Thus, the first resilient element 280 controls the pivoting movement of the rocker unit 400 as described in greater detail below. In particular, a force applied to the head portion 310 during use of the oral care implement 100 must exceed a force of the first resilient element 280 in order for the rocker unit 400 to pivot a sufficient amount for the contact element 436 of the motor chassis 410 to contact and actuate the actuator element 265 on the printed circuit board 261 of the control unit 260. When the rocker unit 400 is in the normal position as shown in FIG. 8, the first resilient element 280 is aligned along the motor axis C-C. When the rocker unit 400 is moved into the excess pressure position as shown in FIG. 10, the first resilient element 280 is moved out of alignment with the motor axis C-C, as described in more detail below.

Referring to FIGS. 8-11, the function and operation of the oral care implement 100, and particularly the rocker unit 400 and the control unit 260 thereof, will be described.

Figure 9:
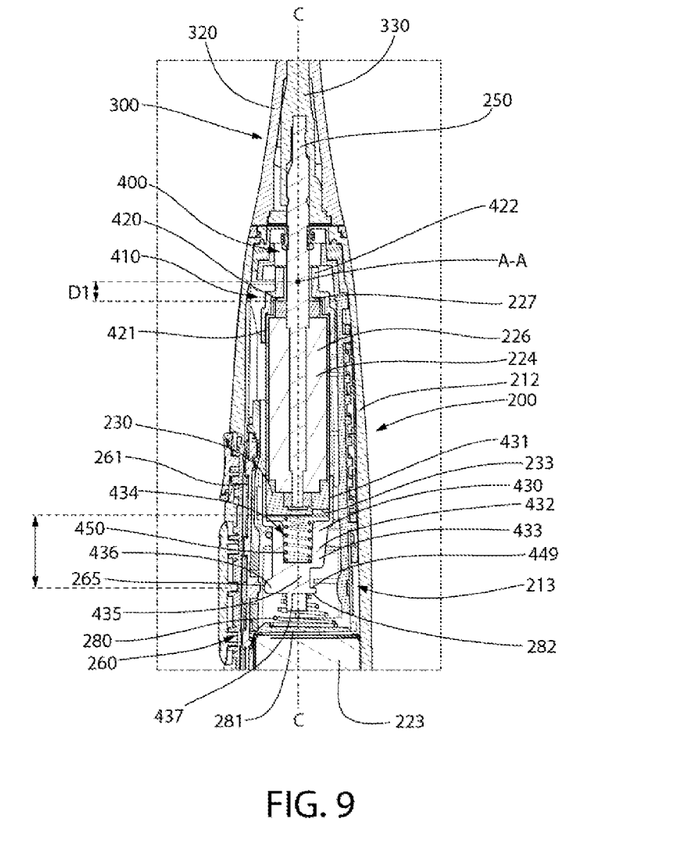
FIG. 9 is a close-up view of area IX of FIG. 8.

First, FIGS. 8 and 9 illustrate the oral care implement 100 with the rocker unit 400 in the normal position. The rocker unit 400 is in the normal position when there is no pressure being applied onto the tooth cleaning elements 314 or the head portion 310 of the oral care refill head 300 more generally in the direction of the arrow Z. The rocker unit 400 is also in the normal position when there is pressure being applied onto the tooth cleaning elements 314 or the head portion 310 of the oral care refill head 300 in the direction of the arrow Z, but that pressure is at or below a pressure threshold. In particular, the pressure threshold is dictated by the spring bias of the first resilient element 280. Thus, when the force Z being applied onto the tooth cleaning elements 314 is at or below the spring bias of the first resilient element 280, the first resilient element 280 maintains the rocker unit 400 in the normal position and prevents the rocker unit 400 from pivoting about the pivot axis A-A.

As noted above, the first resilient element 280 biases the rocker unit 400 into the normal position shown in FIGS. 8 and 9. That is, because the first resilient element 280 is fixed at one end (first end 281) relative to the housing 212 and coupled to the lower portion 430 of the motor chassis 410 at its opposite end (second end 282), the first resilient element 280 biases the rocker unit 400 in the normal position. In the normal position, the first resilient element 280 extends from the first end 281 to the second end 282 along an axis that is coaxial with the motor axis C-C. Thus, when the rocker unit 400 moves from the normal position to the excessive pressure position, the rocker unit 400, and particularly the lower end thereof, moves in a direction that is generally orthogonal to the axis of the first resilient element 280. Stated another way, the first resilient element 280 is oriented so that its spring force is oriented in the direction of the motor axis C-C.

Figure 11:
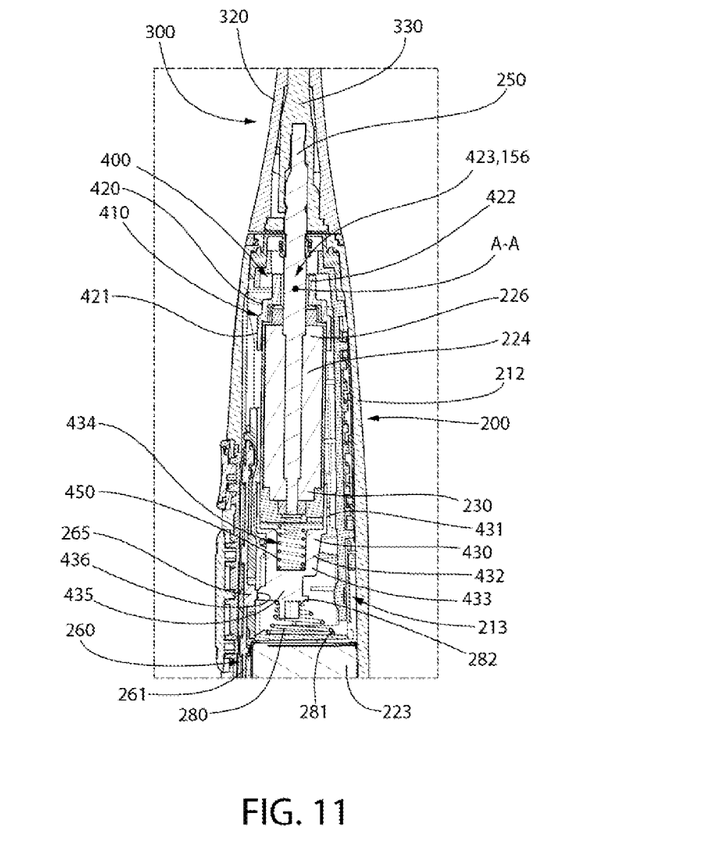
FIG. 11 is a close-up view of area XI of FIG. 10.

FIGS. 10 and 11 illustrate the oral care implement 100 whereby the rocker unit 400 has been altered from the normal position to the excess pressure position. In particular, the force Z being applied onto the tooth cleaning elements 314 exceeds the pressure threshold and overcomes the bias of the first resilient element 280. Thus, when the force Z which exceeds the pressure threshold is applied onto the tooth cleaning elements 314 (or generally onto the head portion 310 in the direction indicated by the arrow labeled "Z"), the rocker unit 400 is altered from the normal position to the excessive pressure position, which is the position of the rocker unit 400 shown in FIGS. 10 and 11.

As seen by comparing FIGS. 9 and 11, the first resilient element 280 extends from a first end to a second end in a direction of the motor axis C-C. However, when the rocker unit 400 is altered from the normal position to the excessive pressure position, the lower portion of the rocker unit 400 pivots in a direction that is generally transverse to the motor axis C-C. Thus, in the exemplified embodiment, the rocker unit 400 does not pull the first resilient element 280 in the direction of its spring force. Rather, the rocker unit 400 pulls the first resilient element 280 in a direction transverse to its spring force during an excess pressure situation as described herein.

In particular, when the rocker unit 400 is altered into the excessive pressure position, the rocker unit 400 pivots about the fixed pivot axis A-A which is defined by the first and second pivot mounting means 423, 156. In particular, the upper portion 420 of the motor chassis 410 pivots relative to the pins 157 (see FIG. 7) which are fixed relative to the housing 212. As the upper portion 420 of the motor chassis 410 pivots, so too does the motor 224 and the lower portion 430 of the motor chassis 410. In particular, the lower portion 430 of the motor chassis 410 pivots a sufficient amount so that the contact element 436 of the lower portion 430 of the motor chassis 410 contacts the actuator element 265 of the control unit 260 with sufficient force to actuate the actuator element 265. As noted above, the actuator element 265 may be a trigger switch such that when the actuator element 265 is pressed on by the contact element 436, the actuator element 265 is actuated. The contact element 436 is shown in contact with the actuator element 265 in FIGS. 10 and 11.

Moreover, as best shown in FIG. 10, upon the contact element 436 actuating the actuator element 265 due to a pressure being applied to the oral care refill head 300 which exceeds the pressure threshold, the control unit 260 initiates generation of a user perceptible signal. In the exemplified embodiment, the user perceptible signal is the activation of a light source 380 to generate and emit light. In the exemplified embodiment, the light source 380 is located within the internal chamber 213 of the housing 212 along a bottom portion thereof adjacent to the end cap 225. Furthermore, in some embodiments a lower annular ring portion 290 of the handle 200 (which may be formed by the end cap 225) is transparent or translucent or otherwise light transmissive so that light emitted by the light source 380 is emitted through the lower annular ring portion 290 of the handle 200 where it can be seen by a user of the oral care implement. Thus, upon seeing light emitted through the lower annular ring portion 290 of the handle 200, the user will know that he/she is brushing with too much force and that he/she should adjust his/her brushing technique. The light emitted from the light source 380 may be white light, yellow light, red light, or light of any other color.

In other embodiments, the light source may be positioned at other locations within the handle 200. For example, activation of the actuator element 265 of the control unit 260 may cause the control unit 260 to activate a light source located along a rear of the handle 200 to emit light through the rear of the handle 200. In other embodiments, activation of the actuator element 265 may cause the control unit 260 to activate a light source located along a front of the handle 200 or at any other location along the oral care implement 100 to emit light therefrom that can be seen by a user. The activation of the light source 380 provides an indication to a user of excessive brushing pressure that can then be remedied by the user.

Although activation of the actuator element 265 causes the control unit 260 to activate a light source in the exemplified embodiment, in other embodiments different user perceptible signals may be generated upon activation of the actuator element 265. For example, the oral care implement may comprise a sound emission device (such as a speaker) and activation of the actuator element 265 may cause the control unit 260 to activate the sound emission device to generate a sound that can be heard by the user. In still other embodiments, upon activation of the actuator element 265, the control unit 260 may alter an operating characteristic of the motor 224 by either abruptly stopping operation of the motor 224, slowing down the speed of the motor 224, increasing the speed of the motor 224, pulsing the motor 224, or the like. Thus, this may form a haptic user perceptible indicator or signal. In some embodiments, activation of the pressure actuator element 265 may cause the control unit 260 to both activate the light source 380 and alter an operating characteristic of the motor 224. In one embodiment, activation of the pressure actuator element 265 may cause the control unit 260 to both activate the light source 380 and reduce the speed of the motor 224, and hence thereby reduce the vibrations generated by the motor 224. As noted above, the light source 380 may be configured to pulse in some embodiments. Moreover, the light source 380 may pulse or otherwise illuminate in red in some embodiments.

Upon a user reducing the force Z being applied onto the tooth cleaning elements 314 to a magnitude that is below the predetermined threshold, the rocker unit 400 will be altered back from the excessive-pressure position into the normal position. This is because, as noted above, the rocker unit 400 is biased into the normal position by the first resilient element 280. Thus, user force is required to alter the rocker unit 400 from the normal position into the excessive pressure position, and upon cessation of the force the rocker unit 400 will be automatically altered from the excessive pressure position back to the normal position. In altering from the excessive pressure position to the normal position, the rocker unit 400 will no longer actuate the actuator element 265 and the control unit 260 will stop the generation of the user perceptible signal. The bias or strength of the first resilient element 280 will dictate the pressure threshold required to actuate the actuator element 265 of the control unit 260.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

The invention claimed is:

1. An oral care implement handle comprising:
a gripping portion having a housing defining an internal chamber and a distal end surface;
a rocker unit comprising:
a stem extending from the distal end surface of the gripping portion and configured to be detachably coupled to an oral care refill head;
a motor operably coupled to the stem to impart movement to the stem, the motor having a motor axis; and
a motor chassis supporting the motor and comprising a contact element; and
a power source positioned within the internal chamber;
a control unit operably coupled to the motor and the power source, the control unit comprising an actuator element, the control unit configured to initiate generation of a user perceptible signal upon the actuator element being actuated; and
a first resilient element operably coupled to the motor chassis that biases the rocker unit into a normal position;
the rocker unit pivotably mounted within the internal chamber so as to be pivotable relative to the housing about a fixed pivot axis so that upon a pressure being applied to the oral care refill head that exceeds a pressure threshold, the bias of the first resilient element is overcome and the rocker unit is altered from the normal position to an excessive pressure position in which the contact element actuates the actuator element.

2. The oral care implement handle according to claim 1 wherein the motor chassis comprises:
   an upper portion extending beyond a top end of the motor and comprising a first pivot mounting means that mates with a second pivot mounting means to accomplish the pivotable mounting of the rocker unit within the internal chamber, the second pivot mounting means being fixed relative to the housing; and
   a lower portion extending beyond a bottom end of the motor and comprising the contact element.

3. The oral care implement handle according to claim 2 further comprising:
   wherein the first pivot mounting means is axially spaced a first distance above the top end of the motor; and
   wherein the contact element is axially spaced a second distance below the bottom end of the motor.

4. The oral care implement handle according to claim 3 wherein the second distance is greater than the first distance.

5. The oral care implement handle according claim 2 further comprising:
   the upper portion of the motor chassis comprising: an upper sleeve section in which a top portion of the motor nests; and an upper hub section through which the stem extends, the upper hub section comprising the first pivot mounting means; and
   the lower portion of the motor chassis comprising: a lower sleeve section in which a bottom portion of the motor nests; and a body section protruding below the bottom end of the motor, the first resilient element operably coupled to the body section.

6. The oral care implement handle according to claim 2 wherein one of the first and second pivot mounting means comprises a pair of bosses aligned along the pivot axis and the other one of the first and second pivot mounting means comprises a pair of depressions aligned along the pivot axis and configured to mate with the pair of bosses.

7. The oral care implement handle according to claim 2 wherein the upper portion of the motor chassis is a first component and the lower portion of the motor chassis is a second component that is separate and distinct from the first component.

8. The oral care implement handle according to claim 2 wherein the rocker unit further comprises a second resilient element compressed between the bottom end of the motor and the lower portion of the motor chassis, the second resilient element aligned along the motor axis in both the normal and excessive pressure positions.

9. The oral care implement handle according to claim 1 wherein the first resilient element has a first end coupled to the motor chassis and a second end fixed relative to the housing.

10. The oral care implement handle according to claim 9 wherein the motor chassis comprises a post that extends along the motor axis and terminates in a free distal end, the first end of the first resilient element coupled to the post.

11. The oral care implement handle according to claim 10 wherein the first resilient element comprises a coil spring; and wherein, when the rocker unit is in the normal position, the coil spring is aligned along the motor axis.

12. The oral care implement handle according to claim 11 wherein the coil spring is a conical coil spring.

13. The oral care implement handle according to claim 1 wherein the control unit comprises a printed circuit board and the actuation element is a trigger switch on the printed circuit board.

14. The oral care implement handle according to claim 1 further comprising a light source operably coupled to the control unit, and wherein, upon actuation of the actuator element, the control unit is configured to: (1) illuminate the light source; and (2) alter an operating characteristic of the motor.

15. The oral care implement handle according to claim 1 wherein the contact element comprises a protuberance that protrudes transversely to the motor axis.

16. An oral care implement comprising:
   the oral care implement handle according to claim 1; and
   the oral care refill head, the oral care refill head comprising a head portion having an oral care treatment tool and sleeve portion configured to be detachably coupled to the stem of the oral care implement handle.

* * * * *